April 9, 1929.　　　T. J. MURPHY　　　1,708,678
ELECTRICITY RECTIFIER
Filed May 18, 1925　　　3 Sheets-Sheet 1
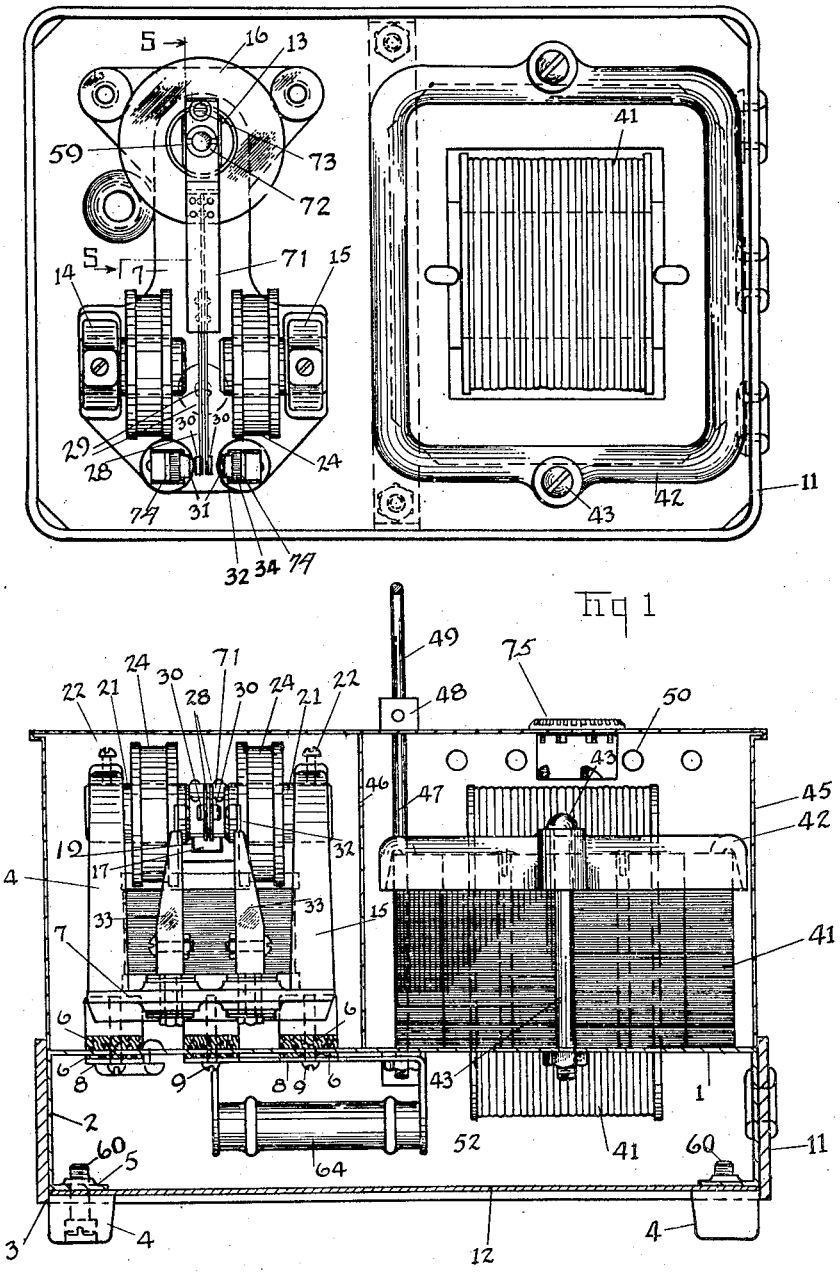

April 9, 1929. T. J. MURPHY 1,708,678
ELECTRICITY RECTIFIER
Filed May 18, 1925 3 Sheets-Sheet 2
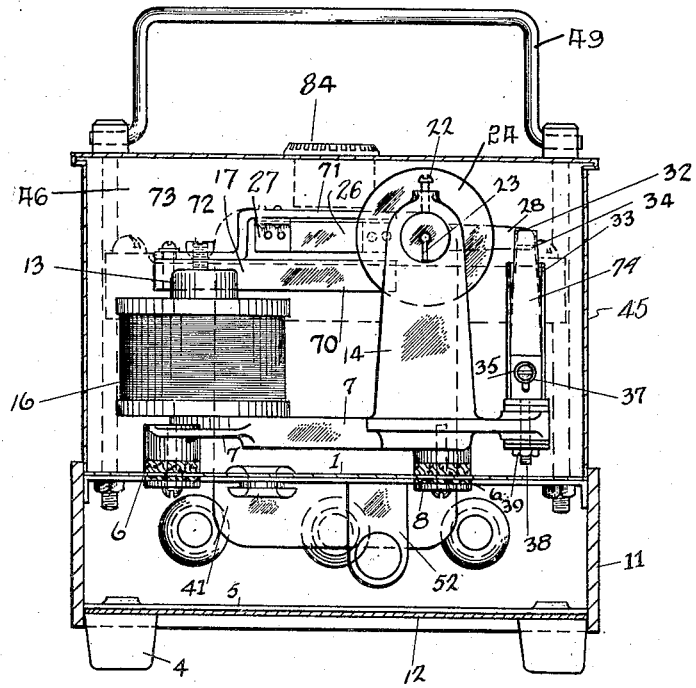

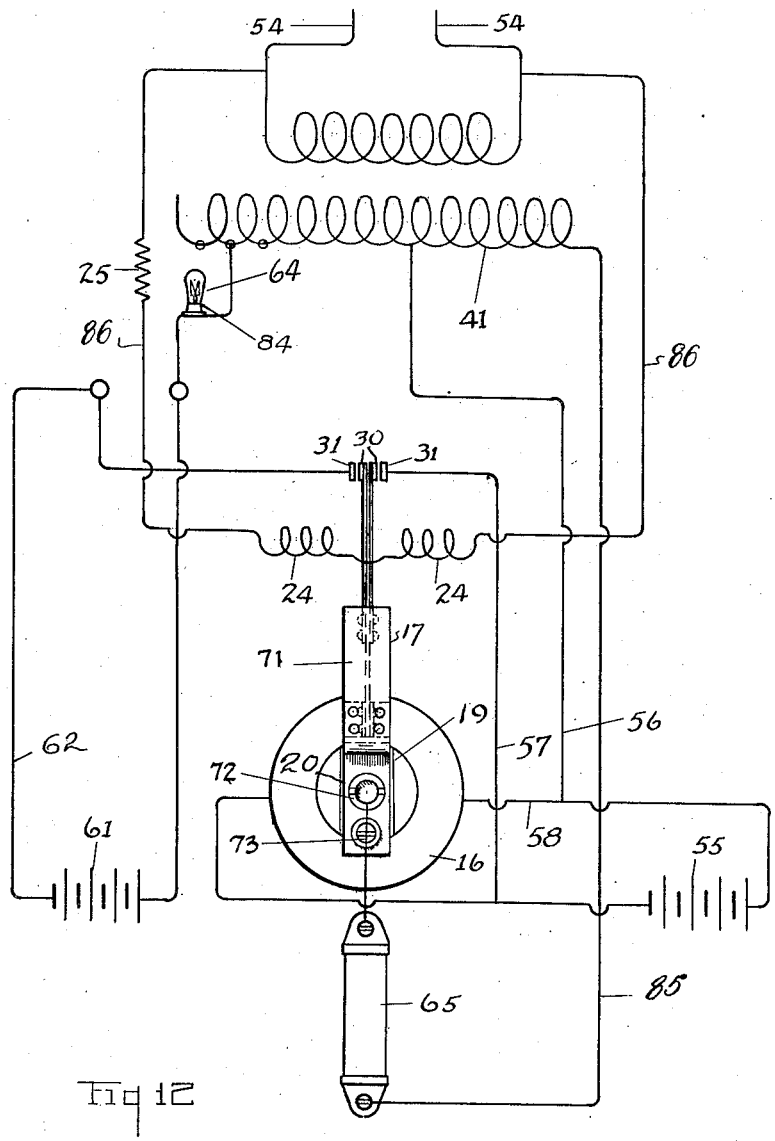

Patented Apr. 9, 1929.

1,708,678

UNITED STATES PATENT OFFICE.

THOMAS J. MURPHY, OF STAMFORD, CONNECTICUT.

ELECTRICITY RECTIFIER.

Application filed May 18, 1925. Serial No. 31,244.

My invention has for its object to provide a vibrating electricity rectifier that may be made at a low cost of production and yet which will be efficient to rectify an alternating current to produce a unidirectional current that may be used for any suitable purpose, such as for charging a storage battery. The invention also provides structural features that make such a rectifier not only efficient but also practically silent in its operations. It also provides one that may be readily assembled and permanently adjusted at a factory to produce efficient results.

Structures containing the invention may in their details partake of different forms. To illustrate and describe the operation of a practical application of the invention I have selected a structure containing the invention as an example of such structures. The structure selected is illustrated in the accompanying drawings.

Figure 1 illustrates a top view of the rectifier. Fig. 2 illustrates an end view of the rectifier, the enclosing case being shown in section. Fig. 3 illustrates a side view of the rectifier. Fig. 4 illustrates a contact supporting member. Fig. 5 is a section showing the construction of the polarizing magnet. Figs. 6 to 11 show the front and edge views of the resilient elements that make up the contact members shown in Fig. 4. Fig. 12 is a diagram of a system of connections that may be used for rectifying an alternating current and utilizing both the positive and negative parts of the current flow.

The electricity rectifier embodying my invention is particularly efficient for charging radio batteries, the sound of the vibrating reed being completely confined to within the instrument. The rectifying elements are supported on a sheet metal member 1 that is so constructed as to muffle the sound produced therein. Its end portions 2 are bent downward and then inwardly as at 3 to resiliently support the moving elements whereby the vibration caused by the reed will be absorbed and not transmitted to a supporting stand or floor or that on which the rectifier instrument may rest. Rubber pads 4 may be bolted to the laterally extending portion 5 by means of the bolts 60. The pads 4 further sound insulate the instrument. The rectifier is also sound insulated by means of the cork washers 6 located above and below the sheet metal base plate 1 and clamped between the supporting frame 7 of the rectifier and washers 8 by the screws 9. Thus the resonating or sound board effect is entirely eliminated.

The sheet metal base 1 may be enclosed in a shell 11 and the bottom of the base may be closed by a plate 12.

The frame 7 of the rectifier is provided with protruding parts 13, 14 and 15 that may be cast integral with the base. The part 13 may be utilized as the core of a low resistance current coil which may be placed on the part 13 and form the electromagnet 16. The upper end of the core 13 is slotted and a pole piece 17 is located in the slot. The pole piece 17, however, is spaced from the upper end of the core 13 by an insulating strip 19. The pole piece 17, and insulating piece 19 are secured in position by means of the bolt 20 which passes through the core 13. A bushing may be located in the core for receiving the bolt and thus electrically insulating the bolt from the pole piece. The continuity through magnetic material between the core and the pole piece is avoided by this construction and the pole piece 17 is readily demagnetized. The bolt may be made a terminal for the electric current.

The pole piece 17 extends laterally over the frame 7 to a point between the protruding parts 14 and 15 of the frame 7. The protruding parts 14 and 15 support the cores 21 and coils 24 that extend toward each other, the arrangement being such that the end of the pole piece 17 is located near the inner ends of the cores 21. The cores 21 have, relatively a large diameter and holes are formed in the upper ends of the parts 14 and 15 for receiving them. The cores 21 may be adjustably secured in the parts 14 and 15 by means of the screws 22. The cores 21 may have radial slots 23 extending from their axes to their surfaces. The coils 24 are high resistance coils and are connected in series with the high resistance 25, such as 2,500 ohms, in the electric system. The cores 21 protrude but little from the inner sides or faces of the coils 24, and the coils are so placed that their faces or ends practically make contact with the sides of the pole piece 17. A vibrating reed or leaf spring 26 is secured by means of a bracket 27 to the pole piece 17 at a point above the core 13. The leaf spring 26 extends substantially to the free end of the pole piece 17. A pair of very light members 28 are connected to opposite sides and to the free end of the leaf spring 26. They have enlarged disc like portions 29 that cover the ends of the cores 21. The spring 26 and the members 28 are formed of magnetic material and are polarized by the electromagnet 16. The parts 28 are light in weight and being polarized they respond with accuracy to all possible changes and slightest variations in the magnetic field produced by the coils 24. The pole piece 17 is formed of two parts 70 and 71 of magnetic material and together form a fork having parts that are located above and below the leaf spring 26. The part 71 is adjustably secured by the stud 72 that forms a pivot about which the part 71 may be moved relative to the part 70 and thus varying the location of the field about the spring 26. The stud 72 has a tapered head and a countersunk recess for securing the part 71 relative to the part 70. A locking screw 73 may also be used to secure the part 71 relative to the stud 72, the screw 73 being located in a large clearance hole for enabling the adjustment. Thus the reed may be magnetically adjusted relative to the fixed contacts. A relatively powerful direct current is passed through the coil 16 and because of this strength the reed is liable to be drawn against the part 70 of the pole piece but if the reed is located in a split or forked pole piece a lower magnetic reluctance is produced and the reed floats in the field extending from the parts of the pole piece. This also increases the polarization of the reed and causes it to act more positively in response to the variable fields produced by the coils 24.

The parts 28 of the reed are provided at their ends with tungsten contacts 30 that make contact with the silver contacts 31 when the read is moved short distances from its normal or central position by the potential coils 24. The electric connections with the reed are such that the current passes from the silver to the tungsten contacts, which prevents the deposition of the material from one to the other due to the sparking and thus sticking and the deterioration of the contacts is practically prevented.

The silver contacts 31 are supported on light springs 32 that are located in channels 33 for permitting free movement of the spring members 32 and yet retain the contacts 31 in alignment with the contacts 30. The light springs 32 are backed by deadening leaf springs 34 and 74. The channels 33 and the springs 32, 34 and 74 are secured in position by the blocks 35 located in the lower ends of the channels. The parts are secured together by the bolts 36 located in slots 37 formed in the blocks 35. The blocks 35 are secured in position by the threaded pins 38 and the nuts 39. The pins 38 extend through the frame 7 and are secured to the blocks 35. When the three springs are clamped together the spring 74 will be flexed proportional to the offset formed at the end of the spring 34 giving a uniform tension. Preferably, the springs are formed of phosphor bronze and the springs 32 and 34 as shown in Figs. 6 to 9 are reduced just above the blocks 35. The pole piece 17 being spaced from the core 13, the reed becomes demagnetized at once and by reason of the location of the reed in the field produced by the split or forked pole, it responds accurately to the fluctuating field of the cores of the alternating current coils. It is strongly polarized and yet freely floats in the uniform field. Otherwise the vibrator may continue to function an appreciable length of time upon opening of supply line and discharge the battery to which it may be connected.

A transformer is used in conjunction with the rectifying elements and is located on the base 1. The transformer 41 is the shell type transformer. It is clamped in position by the frame 42 and the bolt 43.

The parts of the instrument may be enclosed by a sheet metal case 45. The lower edge of the case 45 is placed within the shell 11. It is provided with a partition 46 that divides its interior into two chambers, one for the rectifier and the other for the transformer. The case is secured in position by the tie bolts 47. The heads 48 of the tie bolts have openings for receiving the ends of the handle 49 whereby the instrument may be conveniently carried. The case may have ventilating openings 50 to allow circulation of air to keep, particularly, the transformer cool.

The resistance coil 25 of the system is supported by means of a bracket 52 that is secured in position within the base. Some of the connections that interconnect the elements of the rectifier and transformer are also located within the base. A tungsten lamp 64 may be used as another resistance of the circuit as hereinafter described. The lamp may be located in a socket 84.

The parts of the rectifier may be interconnected in various ways, and also may be connected variously with the external circuits according to the utility that it is desired to make of the rectifier. In Fig. 12 is shown diagrammatically a connection that may be made. The particular diagram shown in the drawings is for charging two storage batteries in order that both parts of each wave may be utilized, one of the storage batteries being used for polarizing the reed of the rectifier. This battery may have a potential of 6 volts. The other may have a higher voltage. The main supplying lines 54 which connect with a source of alternating supply are connected with the primary of the transformer 41. The storage battery 55 is connected to a mid-point of the secondary of the transformer by the wire 56 and to one of the contacts 31 by the wire 57. It is also connected to the coil 16 by the wires 58 for magnetizing the pole piece 17 to polarize the reed. The potential coils 24 are connected in series and in series with the high resistance coil 25. These coils are connected to the terminals of the primary of the transformer 41 and consequently across the line 54 by means of the wires 86. The coils 24 thus actuate the reed according to the changes in potential on the line 54, and consequently at the terminals of the transformer 41. The reed is connected to one terminal of the secondary of the transformer 41 by the line 85. When, therefore, the connections are made with the main line 54, through any suitable switch, the coils 24 vary the polarization of the cores 21 in accordance with and in synchronism with the variations of the potential of the line that causes the polarity of the cores 21 to weaken in polarity or to alternate from positive to negative and to fluctuate in degree according to the fluctuations that commonly exist in commercial lines. Since the light reed having the elements 26 and 28 is polarized by the coil 16 they vibrate and respond to the changing magnetization of the cores 21 to close the circuit between one or the other of the sets of points or contacts 30 and 31. The connections are such that the circuit is closed through the battery 55 when the potential of the line is in a direction such as to charge the battery 55 and when the potential reverses the reed establishes connections with the other sets of contacts 30 and 31.

A battery 61 may be connected to another midpoint of the secondary of the transformer 41. This connection may be made through a tungsten lamp 64 or other suitable resistance having a high positive temperature coefficient and at a point in the secondary coil according to the potential that it is desired to use in charging the battery 61. The battery is also connected to one of the contacts 31 by means of the wire 62. When, therefore, the reed closes the circuit of the contact 31 with which the battery 61 is connected the battery 61 is charged in the same way that the battery 55 is charged by the current but during the opposite wave parts or phase. Suitable switches and fuses, such as the fuse 65, may be used for the protection of the circuits.

I claim:

1. In a rectifying instrument, a base, a polarizing magnet supported on the base, a pole piece supported on the end of the core of the electromagnet, a non-magnetic material for separating the pole piece from the core of the electromagnet, a circuit controlling reed located in the field of the pole piece and electromagnets for varying the field.

2. In a rectifying instrument, a base, a polarizing magnet supported on the base, a pole piece supported on the end of the core of the electromagnet, a non-magnetic material for separating the pole piece from the core of the electromagnet, a circuit controlling reed located in the field of the pole piece and electromagnets for energizing the field, and means for electrically insulating the reed and pole piece from the core.

3. In a rectifying instrument, a reed having a contact, a contact located in circuit closing position relative to the contact of the reed, a spring member for supporting the last named contact, a second spring member elastically held in contact with the first named spring member and having a turned end projecting away from the first named spring member, and a third spring member elastically pressed against the turned end to press the end of the second named contact against the first named contact.

4. In a rectifying instrument, a reed formed of magnetic material and having a contact, a second contact located in circuit closing position relative to the first named contact, and a magnet for polarizing the reed of magnetic material and having a pole piece having parts, one located above the path of movement of the reed and the other located below the path of movement.

5. In a rectifying instrument, a magnetized element having a major extremity and a bifurcated extremity, a source of alternating current, coils connected to the source for energizing the bifurcated extremity, and an armature resiliently supported at the major extremity and extending in proximity to the bifurcated extremity after completing the unidirectional circuit.

6. In a rectifying instrument, a source of alternating current, a pair of semi-rigid magnetizable elements, contacts located at the outer extremities of the magnetizable elements, a leaf spring for supporting the magnetizable elements, means for polarizing the said elements, a pair of coils for actuating the elements in synchronism with the alternating current supply, and a pair of contacts located in circuit and closing position relative to the first named contacts.

In testimony whereof I have hereunto signed my name to this specification.

THOMAS J. MURPHY.